United States Patent
Kajihara et al.

(10) Patent No.: US 11,913,167 B2
(45) Date of Patent: Feb. 27, 2024

(54) METHOD FOR MANUFACTURING SYNTHETIC LEATHER

(71) Applicants: DAIICHI KASEI CO., LTD., Tokyo (JP); KAJIHARA DESIGN STUDIO INC, Hokkaido (JP)

(72) Inventors: Hidetoshi Kajihara, Hokkaido (JP); Yukio Honda, Tokyo (JP); Tomoyuki Yabe, Tokyo (JP)

(73) Assignees: DAIICHI KASEI CO., LTD, Tokyo (JP); KAJIHARA DESIGN STUDIO INC, Hokkaido (JP)

( * ) Notice: Subject to any disclaimer, the term of this patent is extended or adjusted under 35 U.S.C. 154(b) by 144 days.

(21) Appl. No.: 17/606,147

(22) PCT Filed: Jan. 20, 2021

(86) PCT No.: PCT/JP2021/001769
§ 371 (c)(1),
(2) Date: Oct. 25, 2021

(87) PCT Pub. No.: WO2021/157351
PCT Pub. Date: Aug. 12, 2021

(65) Prior Publication Data
US 2022/0195661 A1   Jun. 23, 2022

(30) Foreign Application Priority Data
Feb. 7, 2020 (JP) ................. 2020-019859

(51) Int. Cl.
*D06N 3/14* (2006.01)
*B32B 27/12* (2006.01)
(Continued)

(52) U.S. Cl.
CPC ............... *D06N 3/14* (2013.01); *B32B 27/12* (2013.01); *B32B 27/40* (2013.01); *B32B 38/06* (2013.01); *D06P 1/34* (2013.01); *D06P 1/5285* (2013.01)

(58) Field of Classification Search
CPC .......... D06P 1/5285; D06P 1/34; B32B 38/06; B32B 27/40; B32B 27/12; D06N 3/14
See application file for complete search history.

(56) References Cited

FOREIGN PATENT DOCUMENTS

| JP | S51-22803 | 2/1976 |
|----|-----------|--------|
| JP | S59-100778 | 6/1984 |

(Continued)

OTHER PUBLICATIONS

Machine translation of JP51022803; Satoru; Publication date: Feb. 23, 1976.*

(Continued)

*Primary Examiner* — Vishal I Patel
(74) *Attorney, Agent, or Firm* — Meunier Carlin & Curfman LLC (57) ABSTRACT

[Problem] To provide a novel method for manufacturing synthetic leather that is colored using dye.
[Solution] A method for manufacturing synthetic leather having an outer surface layer on a base fabric, said method comprising the steps of: (i) coating a releasable base material with an outer surface layer composition containing a polyurethane resin and at least one dye selected from natural dyes and chemical dyes, and drying the coating to form an outer surface layer; and (ii) layering the outer surface layer over a base fabric.

13 Claims, 2 Drawing Sheets

(51) Int. Cl.
    *B32B 27/40*     (2006.01)
    *B32B 38/06*     (2006.01)
    *D06P 1/34*     (2006.01)
    *D06P 1/52*     (2006.01)

(56) References Cited

FOREIGN PATENT DOCUMENTS

| | | |
|---|---|---|
| JP | S59-100779 | 6/1984 |
| JP | H2-61181 | 3/1990 |
| JP | H2-251685 | 10/1990 |
| JP | H4-41783 | 2/1992 |
| JP | H6-235177 | 8/1994 |
| JP | H9-241978 | 9/1997 |
| JP | 2008-050733 | 3/2008 |
| WO | 2019/096732 | 5/2019 |

OTHER PUBLICATIONS

Machine translation of JP2008050733A; Takagi Taiji; Publication date: Jun. 3, 2008.*
Machine translation of JPH0261181A; Komura Yutaka; Publication date: Mar. 1, 1990.*
International Search Report and Written Opinion dated Apr. 6, 2021, from International Application No. PCT/JP2021/001769, 11 pages.
Extended European Search Report dated Jan. 5, 2023, in corresponding European application No. 21751468.6.
Notice of Reasons for Refusal dated Jun. 29, 2022, in corresponding Japanese patent application No. 2021-575697.
Decision to Grant a Patent dated Dec. 21, 2022, in corresponding Japanese patent application No. 2021-575697.

* cited by examiner

METHOD FOR MANUFACTURING SYNTHETIC LEATHER

TECHNICAL FIELD

The present invention relates to a method for manufacturing synthetic leather dyed with a dye.

BACKGROUND ART

Synthetic leather is a woven fabric, knitted fabric, non-woven fabric, or the like that has been surface-finished, and is widely used in shoes, bags, clothing, automobile interior materials, interiors, furniture, and the like. Synthetic leather is roughly classified into dry synthetic leather produced by a dry method and wet synthetic leather produced by a wet method. Dry synthetic leather is produced by adhering a skin layer made of a synthetic resin such as a polyurethane resin to a base cloth and integrating them. Meanwhile, wet synthetic leather has a porous layer of polyurethane foam or the like that is interposed between the base cloth and the skin layer.

Synthetic leather is colored in various colors for use depending on the application. Coloring of synthetic leather includes a method using a pigment and a method using a dye. Coloring using a pigment is generally performed by a method including coating a synthetic resin liquid in which a pigment is mixed. Such a coloring method is simple as a creating technique, but tends to result in the lack of color development and depth. In particular, in a case where a large amount of a pigment is mixed with a resin liquid and used in order to produce a dark-colored or bright-colored synthetic leather, there is a problem that physical properties such as fastness of the synthetic leather are remarkably lowered. Meanwhile, coloring using a dye is generally performed by a method for dyeing a synthetic leather, in which a resin skin layer is formed on a base cloth, with an acid dye, a reactive dye, or the like (so-called piece dyeing method) (for example, Patent Literatures 1, 2, and 3). Coloring using a dye provides a transparent feeling and deep coloring as compared with pigment coloring. However, a dyed product using an acid dye has a problem that color transfer is likely to occur. Further, in a case where a reactive dye is used, it is necessary to use a special dyeable resin or an additional additive for improving dyeability, and there is a problem that the resin material to be used is limited. Furthermore, a synthetic leather dyed with a dye has a problem that it is easily discolored and has poor fastness. Due to such problems, coloring of synthetic leather is mainly performed using pigments, and coloring using dyes has not yet become a general method.

CITATION LIST

Patent Literature

Patent Literature 1: JP Patent Publication (Kokai) No. 2-251685 A (1990)
Patent Literature 2: JP Patent Publication (Kokai) No. 6-235177 A (1994)
Patent Literature 3: JP Patent Publication (Kokai) No. 4-41783 A (1992)

SUMMARY OF INVENTION

Under such circumstances, it is desired to develop a novel method for manufacturing synthetic leather colored with a dye.

The present invention encompasses the following embodiments.

[1] A method for manufacturing synthetic leather having a skin layer on a base cloth, comprising steps of:
 (i) coating a mold-releasable substrate with a skin layer composition containing at least one dye selected from a natural dye and a chemical dye and a polyurethane resin and drying the composition to form a skin layer; and
 (ii) laminating the skin layer on a base cloth.

[2] The production method according to the above [1], wherein the dye is in at least one form of a dye extract and a dye powder so as to be mixed with the polyurethane resin in the step (i).

[3] The production method according to the above [1] or [2], wherein the dye is evenly dispersed in the polyurethane resin in the skin layer.

[4] The production method according to any one of the above [1] to [3], wherein the natural dye is selected from plant-derived natural dyes, animal-derived natural dyes, and mineral-derived natural dyes, and chemical dyes are selected from the group consisting of disperse dyes, reactive dyes, acid dyes, and vat dyes.

[5] The production method according to any one of the above [1] to [4], wherein the dye includes natural plant-derived dyes.

[6] The production method according to any one of the above [1] to [5], wherein the polyurethane resin is a water-based polyurethane resin or a solvent-based polyurethane resin.

[7] The production method according to any one of the above [1] to [6], wherein the base cloth is a knitted fabric, woven fabric, or non-woven fabric of fibers.

[8] The production method according to any one of the above [1] to [7], which comprises a step of forming a porous layer on the base cloth before the step (ii), and wherein the skin layer is laminated on the porous layer in the step (ii).

[9] The production method according to any one of the above [1] to [8], which comprises a step of embossing after the step (ii).

[10] The production method according to any one of the above [1] to [9], which comprises a step of forming a surface treatment layer on the skin layer after the step (ii).

[11] The production method according to any one of the above [1] to [10], which comprises a step of peeling the mold-releasable substrate from the skin layer before or after the step (ii).

[12] The production method according to any one of the above [1] to [11], wherein the dye is contained in an amount of 0.1% to 10% by weight and the polyurethane resin is contained in an amount of 90% to 99.9% by weight based on the total weight of the skin layer.

[13] The production method according to any one of the above [1] to [12], wherein the skin layer has a thickness of 0.1 to 30 μm, and the base cloth has a thickness of 0.2 to 2 mm.

The present invention has one or more of the following effects.

(1) Synthetic leather dyed with a dye can be obtained by a convenient method at low cost.
(2) The production method of the present invention can be applied to various dyes.
(3) Synthetic leather having excellent friction fastness (which has a friction fastness of preferably grade 3 or higher and more preferably grade 4 or higher in the dry test and wet test according to the friction tester type II (Gakushin type) method specified in JIS L0849) can be obtained.

(4) By dispersing the dye in the urethane resin in the skin layer, synthetic leather with reduced or suppressed color transfer can be obtained.

DESCRIPTION OF EMBODIMENTS

Hereinunder, the embodiments of the present invention will be described in detail. The present invention is not limited to the following embodiments, and can be arbitrarily modified and implemented without departing from the gist thereof. In the description of the drawings, the same elements are designated by the same reference numerals, and duplicate description will be omitted. The dimensional ratios in the drawings are exaggerated for convenience of explanation and may differ from the actual ratios.

The upper and lower limits of the numerical range described herein can be arbitrarily combined. For example, when "A to B" and "C to D" are described, the ranges of "A to D" and "C to B" are also included in the range as a numerical range in the present invention. Further, unless otherwise specified, the numerical range "lower limit value to upper limit value" described herein means that it is equal to or more than the lower limit value and equal to or less than the upper limit value.

[Synthetic Leather]

Synthetic leather has a skin layer on a base cloth. The synthetic leather may be either dry synthetic leather or wet synthetic leather. Hereinunder, the composition of the synthetic leather obtained by the production method of the present embodiment will be described with reference to the drawings.

Figure 1:
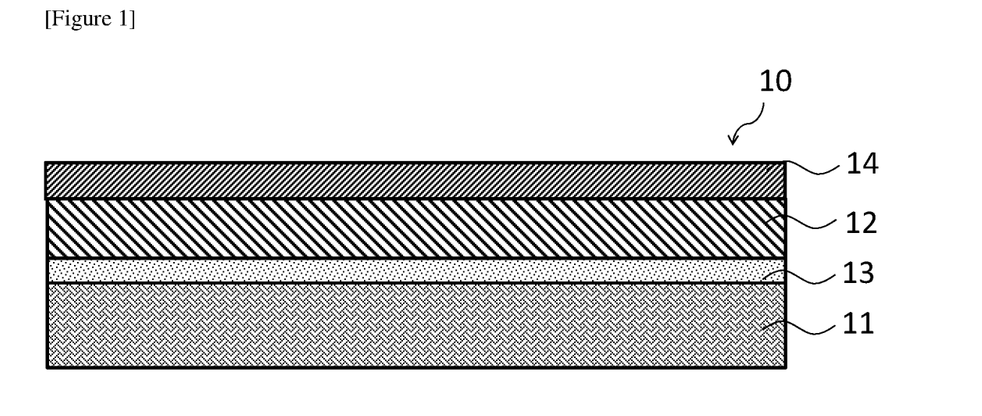
FIG. 1 is a schematic sectional view of the synthetic leather in one embodiment of the present invention.

FIG. 1 is a schematic sectional view of the synthetic leather according to one embodiment of the present invention. Synthetic leather 10 includes a skin layer 12 on a base cloth 11. The skin layer 12 is adhered to the surface of the base cloth 11 via an adhesive layer 13. In the synthetic leather according to one embodiment, the adhesive layer 13 and the skin layer 12 are laminated in that order on the base cloth 11, the base cloth 11 is adhered to the adhesive layer 13, and the skin layer 12 is adhered to the adhesive layer 13.

The adhesive layer 13 may be omitted, and the skin layer 12 may be directly adhered to the base cloth 11.

The synthetic leather 10 further has a surface treatment layer 14 on the skin layer 12. The surface treatment layer 14 is a layer that is arbitrarily arranged and can be omitted. In addition to the above, the synthetic leather 10 may have layers such as an intermediate layer and an intermediate foam layer.

Figure 2:
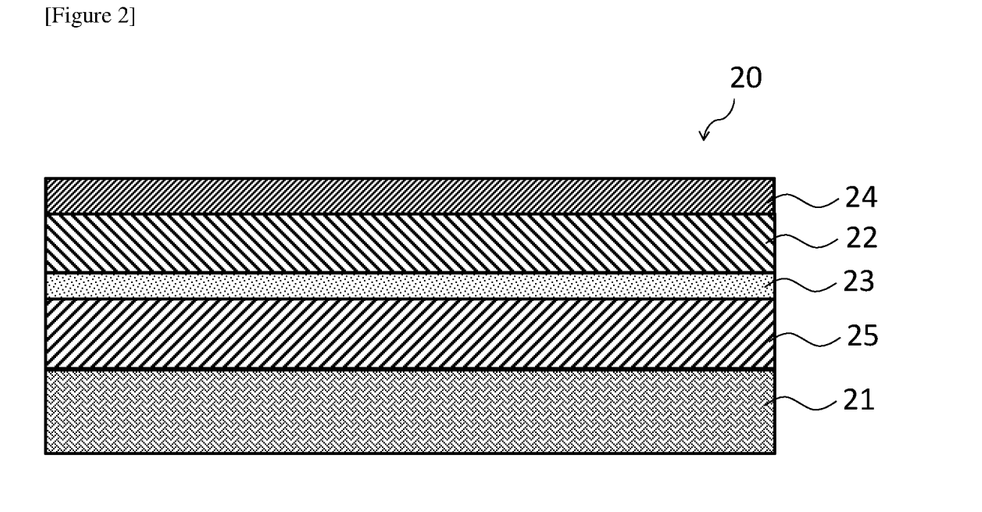
FIG. 2 is a schematic sectional view of the synthetic leather in one embodiment of the present invention.

FIG. 2 is a schematic sectional view of the synthetic leather according to one embodiment of the present invention. Synthetic leather 20 has a porous layer 25 on a base cloth 21, and further has a skin layer 22 on the porous layer 25. The porous layer 25 is adhered to the base cloth 21. By providing the porous layer 25, it is possible to impart the synthetic leather with a soft texture and a voluminous feeling similar to those of natural leather. The skin layer 22 is adhered to the surface of the porous layer 25 via an adhesive layer 23. Also in the synthetic leather 20, the adhesive layer 23 may be omitted, and the skin layer 22 can be directly adhered to the porous layer 25. The synthetic leather 20 further has a surface treatment layer 24 on the skin layer 22, but the surface treatment layer 24 may be omitted. In addition to the above, the synthetic leather 20 may have layers such as an intermediate layer and an intermediate foam layer.

In FIGS. 1 and 2, the skin layers 12 and 22 are composed to include a dye and a polyurethane resin, and have a structure in which the dye is evenly dispersed in the polyurethane resin. As the dye is dispersed so as to be contained in the urethane resin in the skin layer, the synthetic leather 10 has improved fastness and suppressed color transfer.

In FIGS. 1 and 2, an arbitrary irregular pattern or textured pattern such as a leather-like pattern can be optionally provided on the surface of the skin layers 12 and 22 opposite to the adhesive layer.

One embodiment of the present invention relates to the above method for manufacturing synthetic leather. The production method is a method for manufacturing synthetic leather having a skin layer on a base cloth, and includes the following steps (i) and (ii)

(i) Step of applying a skin layer composition containing at least one dye selected from a natural dye and a chemical dye and a polyurethane resin onto a mold-releasable substrate and drying the composition to form a skin layer (skin layer forming step)

(ii) Step of laminating the skin layer on a base cloth (laminating step)

In the method of this embodiment, since the skin layer is formed by using the skin layer composition containing the dye in the above step (i), a structure in which dye components are dispersed and contained in the polyurethane resin can be created. As a result, uneven dyeing can be suppressed, and the fastness can be improved. According to the method of this embodiment, since an additional dyeing step required in the case of piece dyeing, which has been conventionally performed, is not required, no additional equipment for dyeing is required, and thus dyed synthetic leather can be obtained conveniently and at low cost. Further, the method of this embodiment has an advantage that it is not limited to a special dyeable resin and can be applied to various polyurethane resins.

The production method according to one embodiment of the present invention further comprises at least one of the following steps (iii), (iv), (v), and (vi).

(iii) Step of forming a porous layer on the base cloth (porous layer forming step) before the step (ii)

(iv) Step of embossing after the step (ii) (embossing step)

(v) Step of forming a surface treatment layer on the skin layer after the step (ii) (surface treatment step)

(vi) Step of peeling the mold-releasable substrate from the skin layer before or after the step (ii) (mold-releasable substrate peeling step)

Hereinunder, each step of the method for manufacturing synthetic leather will be described in order.

(i) Skin Layer Forming Step

In this step, the skin layer composition is applied onto a mold-releasable substrate and dried, thereby forming a skin layer.

(a) Preparation of Skin Layer Composition

The skin layer composition comprises at least one dye selected from a natural dye and a chemical dye, a polyurethane resin, and if necessary, other resin components and various additives.

The method for preparing the skin layer composition is not particularly limited, and the skin layer composition is formed by, for example, mixing a polyurethane resin, a dye, and if necessary, other resin components and various additives (other components). The mixing conditions are not particularly limited as long as the dye component is evenly dispersed or dissolved in the resin component.

(Polyurethane Resin)

The type of polyurethane resin is not particularly limited to, for example, solvent-based or water-based ones, but a solvent-based or water-based polyurethane resin is preferable. In a case where a solvent-based or water-based polyurethane resin is used, a dye and, if necessary, other components are added to a solution of a polyurethane resin liquefied with an organic solvent, water, or an aqueous solvent, and mixed so as to obtain a skin layer composition. In one embodiment, the polyurethane resin is a solvent-based polyurethane resin. In one embodiment, the polyurethane resin is a water-based polyurethane resin. The water-based polyurethane resin is preferable from the viewpoint of safety and the like.

The polyurethane resin is not particularly limited, and those conventionally used for the skin layer of synthetic leather can be used. Examples thereof include: polyester polyurethane resins, polyether polyurethane resins, polycaprolactone polyurethane resins, polyester/polyether copolymer polyurethane resins, polyamino acid/polyurethane copolymer resins, polycarbonate polyurethane resins, and modified products thereof (e.g., silicone-modified polyurethane resins). These can be used singly or in combination of two or more thereof. Further, a silicone-modified polycarbonate polyurethane resin (high-slip urethane resin) having improved wear resistance may be used.

As the polyurethane resin, a commercially available product may be used, or a polyurethane resin synthesized via a polymerization reaction of a polyol, an isocyanate, and a chain extender in a solvent by a conventionally known method may be used.

The polyurethane resin can be used alone or in combination of two or more.

(Dye)

The dye that can be used in the present invention is not particularly limited, and at least one dye selected from a natural dye and a chemical dye is used. The dye is appropriately selected according to the desired hue of the dyed product. Only one type of dye may be used, or two or more types of dyes may be mixed and used.

It is preferable that the dye is in at least one form of a dye extract and a dye powder so as to be mixed with the polyurethane resin.

The dye powder described herein refers to: (1) a particulate matter formed as an aggregate of a dye component; or (2) a particulate matter obtained by crushing a natural product containing a dye component.

Examples of the particulate matter formed as an aggregate of a dye component (1) include those in which an aggregate of a chemical dye is in the particulate form and those in which an aggregate of a natural dye is in the particulate form. For example, it can be obtained by drying a solvent of a dye extract obtained by extracting a dye component with the solvent by a conventional method. The particulate matter formed as an aggregate of a dye component (1) obtained in such manner is in the form of particles containing a dye as a main component, and usually 80% by weight or more, 90% by weight or more, 95% by weight or more, or 99% by weight or more of the particles (100% by weight) is composed of a dye component (dye compound). Preferably, the particulate matter formed as an aggregate of a dye component (1) is in the form of particles substantially composed of a dye component (dye compound), and 95% by weight or more (further 99% by weight or more, particularly 100% by weight) thereof is composed of a dye component (dye compound).

Examples of the particulate matter obtained by crushing a natural product containing a dye component (2) include those obtained by crushing (pulverizing) a natural resource containing a dye component such as a plant, animal, or mineral into particles. The content (content ratio) of the dye component in such particles is not particularly limited, and is, for example, 0.01% by weight to 100% by weight.

In one embodiment, the dye powder is the particulate matter formed as an aggregate of a dye component (1).

In one embodiment, the dye powder is the particulate matter obtained by crushing a natural product containing a dye component (2).

In a case where a dye powder is used, its average particle size is not particularly limited, but for example, it is 10 nm to 100 μm. The smaller the particle size, the better the solubility or dispersibility in a solvent, but the easier it is for the particles to aggregate. In this regard, 1 to 50 μm is preferable, and 10 to 30 μm is more preferable. The "average particle size" described herein refers to the volume-based average particle size unless otherwise specified. The method for measuring the average particle size can be obtained by the dynamic light scattering method or the laser diffraction light scattering method described in JIS Z8825.

The dye extract means a solution in which a dye component (dye compound) is dissolved or dispersed in a solvent. The dye extract is obtained by extracting the dye component with a solvent by a conventional method.

As the dye extract, a commercially available product may be used, or a dye extract extracted using a natural resource such as a plant, animal, or mineral as an extraction solvent may be used.

Examples of an extraction method include a conventional method, for example, a method in which a natural resource is subjected to at least one treatment selected from drying, shredding, crushing, and the like, and then extraction is performed using a suitable extraction solvent under normal pressure or applied pressure at room temperature or with heating, followed by, if necessary, purification and concentration. Examples of the concentration and purification method include filtration, centrifugation, distillation, chromatography, and dialysis. In order to increase the extraction efficiency, it is preferable to use a product that has been treated by drying, freeze-drying, shredding, crushing, and the like. The obtained extract can be used singly or in combination of two or more.

As the extraction solvent, water, a hydrophilic solvent, a lipophilic solvent, and a mixture thereof can be used. Examples of the extraction solvent include: water; alcohols such as methanol, ethanol, n-propanol, i-propanol, n-butanol, i-butanol, sec-butanol, t-butanol, n-octanol, cyclohexanol, glycerin, ethylene glycol, and propylene glycol; ethers such as chain ethers (e.g., ethyl ether, propyl ether, isopropyl ether, and dimethoxyethane), cyclic ethers (e.g., dioxane and tetrahydrofuran), and mono- or di-alkylene glycol monoalkyl ethers (e.g., cellosolves such as ethylene glycol monomethyl ether and ethylene glycol monoethyl ether and carbitols such as diethylene glycol monoethyl ether); ketones such as acetone, methyl ethyl ketone, methyl isobutyl ketone, and cyclohexanone; esters such as ethyl acetate, butyl acetate, diisononyl adipate (DINA), di-n-alkyl adipate (D610A), acetyltriethyl citrate, and acetyltributyl citrate; halogenated hydrocarbons such as carbon tetrachloride, chloroform, dichloromethane, and 1,2-dichloroethane; aliphatic hydrocarbons such as hexane and octane; alicyclic hydrocarbons such as cyclohexane and cycloheptane; aromatic hydrocarbons such as benzene, toluene, and xylene; nitriles such as acetonitrile and benzonitrile; carboxylic acids such as formic acid and acetic acid; aprotic polar solvents such as N,N-dimethylformamide, N,N-dimethylacetamide, dimethyl sulfoxide, and pyridine. These solvents can be used singly or in admixture of two or more.

In a case where a water-based polyurethane resin is used as the polyurethane resin of the skin layer composition, it is preferable to use water or a hydrophilic solvent as the extraction solvent from the viewpoint of improving the affinity between the water-based polyurethane resin and the extraction solvent, safety, and the like. Specifically, among the above-described extraction solvents, water; alcohols, carboxylic acids, and the like can be mentioned.

In a case where a solvent-based polyurethane resin is used as the polyurethane resin of the skin layer composition, it is preferable to use a lipophilic solvent as the extraction solvent from the viewpoint of the affinity between the solvent-based polyurethane resin and the extraction solvent. Specifically, among the above-described extraction solvents, ethers, ketones, esters, halogenated hydrocarbons, aliphatic hydrocarbons, alicyclic hydrocarbons, aromatic hydrocarbons, nitriles, aprotic polar solvents, and the like can be mentioned.

The dye extract may be obtained by dissolving the above dye powder in a solvent and, if necessary, removing impurities and insoluble components (a portion of the dye component that has not been completely dissolved) by a purification treatment such as filtration.

As the solvent, those exemplified as extraction solvents above can be used.

In one embodiment, the dye is in the form of a dye extract so as to be mixed with the polyurethane resin. In such a case, stable processing can be performed even in the case of reducing the thickness of the skin layer.

In one embodiment, the dye is in the form of a dye powder so as to be mixed with the polyurethane resin. In such a case, a synthetic leather in which discoloration is further suppressed can be obtained.

In one embodiment, the dye is in both the forms of a dye extract and a dye powder so as to be mixed with the polyurethane resin. In such a case, a deeper and darker color can be produced.

At least one natural dye selected from plant-derived natural dyes, animal-derived natural dyes, and mineral-derived natural dyes can be mentioned.

Typical examples of plant-derived natural dyes include powdered plant leaves, stems, bark, roots, flowers, and/or fruits, and plant dyes consisting of liquids or powders extracted from these powders. Specific examples of plant dye pigments include, but are not limited to, indole derivatives, carotenoids, diketones, isohinohane derivatives, anthocyans, chlorophyll (leaf green), chalcone derivatives, flavonoids, tannins, naphthoquinone derivatives, dihydropyran derivatives, and anthraquinone derivatives according to the present invention.

Examples of animal-derived natural dyes include Tyrian purple obtained from *Thais clavigera* and cochineal obtained from Dactylopius coccus Costa.

As mineral-derived natural dyes, for example, those composed of igneous rocks, metamorphic rocks, sedimentary rocks, and radioactive rocks emitting radiation, which are finely powdered to a particle size of 0.01 to 3 μm, can be preferably applied.

Only one type of natural dye may be used, or two or more types of natural dyes may be used in combination.

At least one chemical dye selected from disperse dyes, reactive dyes, acid dyes, and vat dyes can be mentioned. These may be commercially available products or may be synthesized for use.

In one embodiment, dyes include natural plant-derived dyes.

Examples of other resin components include synthetic resins such as polyamide resin, polyacrylate resin, polyvinyl acetate resin, and polyacrylonitrile resin. These synthetic resins can be used singly or in combination of two or more.

The skin layer composition may contain various additives such as a colorant, a filler, a light stabilizer, a UV absorber, an antioxidant, a flame retardant, a crosslinking agent, a leveling agent, a defoamer, a thickener, and the like as necessary.

The contents of the dye and the polyurethane resin in the skin layer are not particularly limited, but it is preferable that the dye is contained in an amount of 0.1% to 10% by weight and the polyurethane resin is contained in an amount of 90% to 99.9% by weight based on the total weight of the skin layer.

In a case where other resin components and various additives are contained, the content of the other resin components (total content when a plurality of types thereof are contained) is preferably 0% to 5% by weight and the content of various additives (total content when a plurality of types thereof are contained) is preferably 0% to 5% by weight based on the total weight of the skin layer.

(b) Application and Drying of Skin Layer Composition

Next, the skin layer composition is applied onto a mold-releasable substrate and dried, thereby forming a skin layer.

Examples of the application method include, but are not particularly limited to, known methods such as roll coating, kiss roll coating, gravure coating, reverse coating, roll brushing, spray coating, dip roll coating, bar coating, knife coating, air knife coating, curtain coating, lip coating, and die coating.

The drying method is not particularly limited, and a suitable method can be appropriately adopted. Heat treatment is performed as necessary. The conditions of heat treatment are not particularly limited, and may include a temperature and a drying time at which a coating film can be dried. In one example of heat treatment, the temperature is, for example, 40° C. to 200° C., preferably 50° C. to 180° C., and more preferably 70° C. to 170° C., and the drying time is, for example, 5 seconds to 30 minutes, preferably 5 seconds to 20 minutes, and more preferably 10 seconds to 10 minutes.

The coating thickness is not particularly limited and is appropriately selected depending on the intended use, but it is preferable that the coating is applied such that the thickness of the skin layer after drying is preferably 0.1 to 30 μm. As long as the thickness of the skin layer is within the above range, synthetic leather having excellent lightness and durability can be obtained.

The mold-releasable substrate is not particularly limited, and may be a substrate having mold releasability with respect to the skin layer composition containing a polyurethane resin, or a substrate subjected to mold release treatment. Examples thereof include mold release paper, a mold release treatment cloth, a water repellent treatment cloth, an olefin sheet or film made of a polyethylene resin or a polypropylene resin, a fluororesin sheet or film, and a plastic film with mold release paper.

When a sheet having a three-dimensional shape such as an irregular pattern or a textured pattern is used as the mold-releasable substrate, it is possible to form a skin layer having an irregular or textured surface.

The mold-releasable substrate is peeled from the surface of the skin layer before or after the subsequent laminating process.

The above step allows forming a skin layer containing at least one dye selected from a natural dye and a chemical dye and a polyurethane resin. The dye is evenly dispersed in the polyurethane resin in the skin layer.

(ii) Laminating Process

In this step, the skin layer is laminated on the base cloth. In a case where there is another layer (e.g., a porous layer) on the base cloth, the skin layer is laminated on the other layer. The method for laminating the skin layer is not particularly limited.

Specific examples thereof include a method in which an adhesive composition is applied to the surface of the skin layer formed on the mold-releasable substrate and dried so as to form an adhesive layer, and the adhesive layer and the base cloth (or another layer in a case where it is provided on the base cloth) are attached to each other. Alternatively, as another method, a method in which an adhesive composition is applied to the surface of the base cloth (or another layer in a case where it is provided on the base cloth) and dried so as to form an adhesive layer, and the adhesive layer and the skin layer are attached to each other may be used.

The base cloth is not particularly limited, and those conventionally used as a base material for synthetic leather can be used. Examples of the base cloth include a knitted fabric, woven fabric, or non-woven fabric of fibers. The base cloth may be a single layer or may have a multi-layer structure.

Examples of fibers that constitute a knitted fabric, woven fabric, or non-woven fabric include synthetic fibers made of a thermoplastic resin, natural fibers, regenerated fibers, semi-synthetic fibers (e.g., diacetate and triacetate), cellulose-based fibers (e.g., rayon, cotton, and linen, etc.), animal fibers (e.g., wool, silk, and feathers), and inorganic fibers (e.g., glass fiber and carbon fiber).

The thermoplastic resin that forms synthetic fibers is not particularly limited as long as it has a fiber-forming ability. For example, it is possible to use polyethylene terephthalate, polytrimethylene terephthalate, polybutylene terephthalate, and the like as well as, for example, polyesters such as low melting point polyesters mainly composed of these thermoplastic resins and further using isophthalic acid as a copolymerization component; polyolefins such as polypropylene, high density polyethylene, medium density polyethylene, low density polyethylene, linear low density polyethylene, and binary or ternary copolymers of propylene and other α-olefins; polyamides such as polyamide 6 and polyamide 66; or a mixture or copolymer thereof.

The fibers can be used singly or in combination of two or more.

If necessary, the fibers that constitute the non-woven fabric or woven or knitted fabric can contain or can be impregnated with various additives such as a flame retardant, a matting agent, a pigment, an antioxidant, an ultraviolet absorber, a light stabilizer, a crystal nucleating agent, and a tick repellent.

In the case of using a knitted fabric or a woven fabric as the base cloth, the weaving method of woven fabrics or the knitting method of knitted fabrics is not particularly limited. For example, in the case of knitted fabrics, knitted fabrics such as circular knitting fabric, tricot knitting fabric, or warp knitting fabric such as Russell knitting fabric can be mentioned.

In the case of using a non-woven fabric as the base cloth, it may be either a short-fiber non-woven fabric or a long-fiber non-woven fabric. The method for manufacturing a non-woven fabric is not particularly limited, but preferably, a spunbond method or a melt blow method is used for a long-fiber non-woven fabric, and a carding method or an air array method is used for a short-fiber non-woven fabric. As the non-woven fabric, a non-woven fabric having a two-layer structure in which the fiber structure constituting the upper layer and the fiber structure constituting the lower layer are laminated by mechanical entanglement is particularly preferable.

The thickness of the base cloth is not particularly limited, but is preferably 0.2 to 2 mm. As long as the thickness of the base cloth is within the above range, synthetic leather having excellent lightness and mechanical properties can be obtained.

For example, the skin layer can be laminated and adhered on the base cloth via the adhesive layer using an adhesive. By peeling the mold-releasable substrate before or after laminating, the dry synthetic leather shown in FIG. 1 can be obtained. Specific examples thereof include a method in which an adhesive layer is formed by applying an adhesive to the surface of the skin layer via roll coating, kiss roll coating, gravure coating, reverse coating, roll brushing, spray coating, dip roll coating, bar coating, knife coating, air knife coating, curtain coating, lip coating, die coating, or the like and drying it, and then the surface of the adhesive layer and the base cloth are pressed as necessary to bring them into close contact with each other. The drying temperature is not particularly limited, but from the viewpoint of adhesion, the conditions that do not allow complete drying are preferable, and in one example, the temperature is 50° C. to 70° C. The pressure for pressurization is also not particularly limited, and in one example, it is 0.1 to 0.5 MPa.

The adhesive forming the adhesive layer is not particularly limited, and those conventionally used as an adhesive in synthetic leather can be used. From the viewpoint of strength of adhesion with the skin layer, it is preferable to use a polyurethane-based adhesive which is an adhesive made of the same type of resin as the resin forming the skin layer. Examples of the polyurethane-based adhesive include a polyether polyurethane adhesive, a polyester polyurethane adhesive, a polycarbonate polyurethane adhesive, a modified product thereof, and a composite type thereof. The adhesive forming the adhesive layer may be used singly or in combination of two or more.

The adhesive layer may contain various additives including a colorant such as colored beads, a pigment, or a dye as long as the adhesion is not reduced.

The thickness of the adhesive layer is not particularly limited, but is preferably 50 to 100 μm. As long as the thickness of the adhesive layer is within the above range, synthetic leather having excellent lightness and mechanical strength can be obtained.

(iii) Porous Layer Forming Step

The method of this embodiment may comprise a step of forming a porous layer on the base cloth before the step (ii). The porous layer is preferably formed between the base cloth and the skin layer (in the case of having an adhesive layer, between the base cloth and the adhesive layer). In the step (ii) described above, by laminating the skin layer on the porous layer formed on the base cloth, synthetic leather having a structure in which the porous layer and the skin layer are laminated in order on the base cloth can be obtained.

By providing the porous layer, a flexible texture, appropriate resilience and elasticity are imparted. The porous layer preferably has a porous structure in which bubbles are evenly dispersed. As air bubbles are evenly dispersed, favorable abrasion resistance, strength, and smoothness can be imparted to the synthetic leather, and also the occurrence of color spots and the like can be suppressed.

The porous layer is not particularly limited as long as it has a porous structure, and those conventionally used as a porous layer of wet synthetic leather can be used. For example, the porous layer can be produced by a general base cloth impregnation method. Specific examples thereof include: a method in which a porous layer is formed on a base cloth by impregnating the base cloth with a resin solution, replacing the solvent with water in the resin solution, and performing drying; and a method in which a base material coated with a resin solution is immersed in a coagulation bath, or partially coagulated with steam and then immersed in a coagulation bath such that the solvent in the resin solution is replaced with the solvent in the coagulation bath (non-solvent or poor solvent of the resin), and drying is performed, thereby forming a porous layer on a base cloth. These methods for forming the porous layer are described in, for example, JP Patent Publication (Kokai) No. 7-132573 A (1995) and JP Patent Publication (Kokai) No. 54-38996 A (1979).

Polyurethane is preferable as the resin for forming the porous layer. Examples of polyurethane include polycarbonate polyurethane, polyether polyurethane, and polyester polyurethane. Of these, polycarbonate polyurethane is preferable from the viewpoint of hydrolysis resistance, heat-resistant deterioration, and the like.

A resin solution for forming the porous layer can contain other components such as various additives, if necessary, in addition to the resin and the solvent as the main agents.

Alternatively, the porous layer may be formed by adding a bubble-generating substance (foaming agent) to a thermoplastic elastomer and foaming it. Specifically, as disclosed in JP Patent Publication (Kokai) No. 2006-307359 A, it is possible to employ, for example, a melt film forming method in which a bubble-generating substance is added to a thermoplastic elastomer (thermoplastic elastomer composition) together with other components such as a colorant and an antioxidant as necessary, and the resulting mixture is melt-kneaded under heating and pressurization using an extrusion molding machine or the like and extruded into a porous film in a molten state, thereby forming a porous layer.

The thickness of the porous layer is appropriately adjusted depending on the type of material forming the porous layer, the use of synthetic leather, and the like. In general, when the thickness is set to about 20 to 800 μm or 30 to 600 μm, a leather-like texture can be imparted to the laminated body, and surface strength and durability against bending can be imparted, which is preferable.

(iv) Embossing Step

The production method of the present embodiment may comprise a step of embossing after the step (ii).

Examples of the embossing method include transfer by an embossing roll, a belt method, and a pressing method of a metal pattern.

(v) Surface Treatment Step

The production method of the present embodiment may include a step of forming a surface treatment layer on the skin layer after the step (ii). By providing the surface treatment layer, the abrasion resistance, high tactile sensation, design property, antifouling property, and friction fastness of the synthetic leather can be improved.

The surface treatment layer is preferably composed of a resin. In particular, polyurethane resins are preferable from the viewpoint of abrasion resistance. Among them, polycarbonate polyurethane resins, polyether polyurethane resins, polyester polyurethane resins, and modified products thereof (particularly silicone-modified polyurethane resins) are preferably mentioned. The type of resin is not particularly limited to, for example, solvent-free resins, solvent-based resins, and water-based resins.

If necessary, the surface treatment layer may contain known additives such as a smoothing agent, a crosslinking agent, a matting agent, and a leveling agent.

The method for forming the surface treatment layer is not particularly limited, but for example, it is carried out by applying a resin composition for forming the surface treatment layer on the skin layer and drying it, thereby forming the surface treatment layer. The method for applying the resin composition onto the skin layer and drying it is not particularly limited, and the same method as that of the skin layer composition can be used. Regarding the surface treatment layer, after forming the skin layer on the base cloth, the surface treatment layer may be formed on the surface of the exposed skin layer by peeling the mold-releasable substrate from the skin layer, or after forming the surface treatment layer on the mold-releasable substrate, the skin layer may be formed on the surface treatment layer, and then laminated on the base cloth and adhered thereto.

In the case of performing the above-described embossing, embossing may be performed on the surface treatment layer after the surface treatment layer is formed, or on the skin layer before the surface treatment layer is formed.

The total thickness of the skin layer and the surface treatment layer is not particularly limited, but for example, it is 2 to 150 μm.

The outermost layer of synthetic leather is preferably non-porous, i.e., pore-free. Since the outermost surface layer is pore-free, wear resistance can be improved.

Further, in order to impart durable waterproofness to synthetic leather, a water repellent treatment may be performed. A known water repellent can be appropriately used for the water repellent treatment. Further, a finishing set may be applied to improve the quality of synthetic leather. Further, if necessary, a paper treatment or the like may be performed after the water repellent treatment.

(vi) Mold-Releasable Substrate Peeling Step

The production method of the present embodiment may include a step of peeling the mold-releasable substrate from the skin layer before or after the step (ii).

The synthetic leather produced by the production method of the present embodiment has a base cloth and a skin layer as essential constituent members, and further has an adhesive layer, a porous layer, and a surface treatment layer. In addition to these, the synthetic leather may be provided with one layer or two or more layers (other layers) between the layers as necessary. Examples of the other layers include a layer having a function of controlling at least one of the surface physical properties and the appearance of the skin layer, for example, an intermediate layer and an intermediate foaming layer.

The outermost layer of synthetic leather is preferably non-porous, i.e., pore-free. Since the outermost surface layer is pore-free, wear resistance can be improved.

Synthetic leather has a friction fastness in the dry test and wet test according to the friction tester type II (Gakushin type) method specified in JIS L0849, which is preferably grade 3 or higher, more preferably grade 4 or higher, and particularly preferably grade 5 or higher.

Synthetic leather can be used for various applications such as shoes, bags, clothing, automobile interior materials (for example, automobile seats, ceiling materials, dashboards, door lining materials, and handles), interiors, furniture (for example, sofas and chairs), and the like, which but are not particularly limited.

EXAMPLES

Hereinafter, the present invention will be described in detail with reference to the Examples below, but the technical scope of the present invention is not limited thereto. In the Examples, "%" and "part(s)" shall be based on weight. In addition, the evaluation of the obtained synthetic leathers was carried out according to the following method.

(Friction Fastness)

The evaluation of friction fastness was performed according to the drying test of 9.2 Friction tester type II (Gakushin type) method of JIS L0849: 2013 (test method for dyeing fastness against friction).

Samples were rubbed with a white cotton cloth (cotton No. 3-1) specified in JIS L0803: 2011 using a Gakushin type dyeing fastness tester (manufactured by YASUDA SEIKI SEISAKUSHO, LTD.). Then, friction fastness was evaluated by classifying the degree of contamination of white cotton cloth using the gray scale for contamination specified in JIS L0805: 2005.

[Production Example 1] Preparation of Matcha Dye Extract-Containing DMF

One hundred (100) parts by weight of dimethylformamide (DMF) and 1 part by weight of a matcha dye powder ("Food Textile" with an average particle size of 30 μm manufactured by TOYOSHIMA & Co., Ltd.) were placed in a beaker and allowed to stand for 1 hour, followed by filtration. Thus, matcha dye extract-containing DMF was obtained.

[Production Example 2] Preparation of Disperse Dye Extract-Containing DMF

One hundred (100) parts by weight of DMF and 1 part by weight of a disperse dye powder ("Dianix Red AC-E" manufactured by Mitsubishi Chemical Corporation) were placed in a beaker and allowed to stand for 1 hour, followed by filtration. Thus, disperse dye extract-containing DMF was obtained.

[Production Example 3] Preparation of Coffee Dye Extract-Containing Distilled Water One hundred (100) parts by weight of distilled water and 1 part by weight of a coffee dye powder ("Food Textile" with an average particle size of 30 μm manufactured by TOYOSHIMA & Co., Ltd.) were placed in a beaker and allowed to stand for 1 hour, followed by filtration. Thus, coffee dye extract-containing distilled water was obtained.

[Production Example 4] Preparation of Disperse Dye Extract-Containing Distilled Water One hundred (100) parts by weight of distilled water and 1 part by weight of a disperse dye powder ("Dianix Red AC-E" manufactured by Mitsubishi Chemical Corporation) were placed in a beaker and allowed to stand for 1 hour, followed by filtration. Thus, disperse dye extract-containing distilled water was obtained.

Example 1

Figure 3:
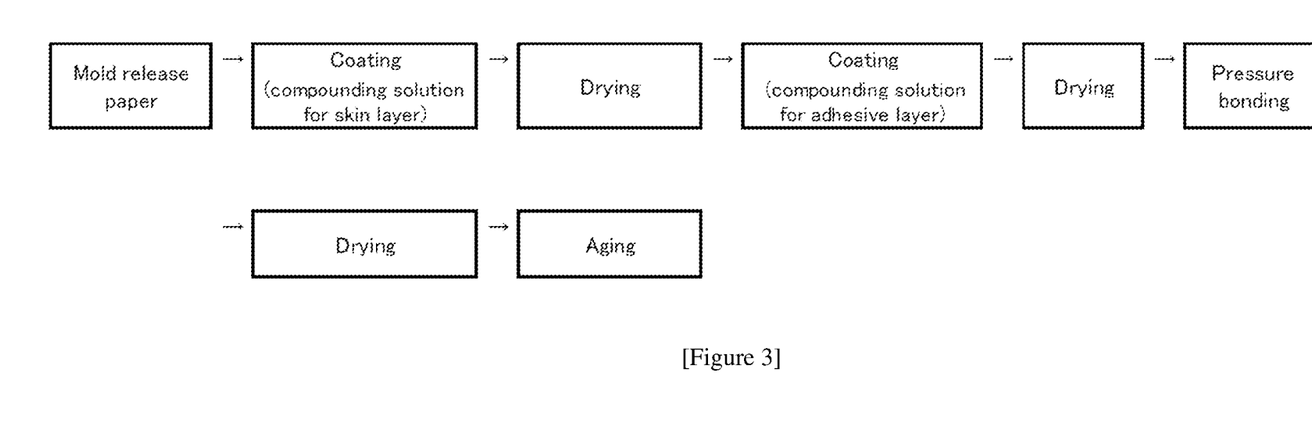
FIG. 3 schematically depicts the outline of the production procedures of synthetic leather in Examples 1 and 2.

Synthetic leather was produced according to the flow chart shown in FIG. 3.

(1) Preparation of Compounding Solution for Skin Layer

One hundred (100) parts by weight of solvent-based polycarbonate polyurethane ("RESAMINE P-880" manufactured by Dainichiseika Color & Chemicals Mfg. Co., Ltd.), 0.1 parts by weight of a matcha dye powder ("Food Textile" manufactured by TOYOSHIMA & Co., Ltd.), and 0.1 parts by weight of the matcha dye extract-containing DMF obtained in Production Example 1 were stirred with a mixer at a rotation speed of 2000 rpm for 3 minutes, thereby obtaining a compounding solution for the skin layer.

(2) Preparation of Compounding Solution for Adhesive Layer

One hundred (100) parts by weight of polyester/carbonate polyurethane ("UD-8373BL" manufactured by Dainichiseika Color & Chemicals Mfg. Co., Ltd.), 20 parts by weight of DMF, 30 parts by weight of methyl ethyl ketone (MEK), and 8 parts by weight of a crosslinking agent ("RESAMINE NE-crosslinking agent" manufactured by Dainichiseika Color & Chemicals Mfg. Co., Ltd.) were stirred with a mixer (2000 rpm) for 3 minutes, thereby obtaining a compounding solution for the adhesive layer.

(3) Production of Synthetic Leather

The compounding solution for the skin layer obtained above was applied to mold release paper ("ARX-1 Semi Matte Type" manufactured by Asahi Roll Co., Ltd.) with a bar coater (coating thickness: 25 μm), and dried at 120° C. for 5 minutes using a hot air dryer, thereby obtaining a skin layer (thickness: 5 μm). Further, the compounding solution for the adhesive layer obtained above was applied to the skin layer with a bar coater (coating thickness: 200 μm; thickness after drying: 100 μm), dried at 80° C. for 1 minute using a hot air dryer, and attached to a base material (100% polyester circular knitted cloth with a thickness of 0.8 mm) using a gravure roll (press pressure: 0.35 MPa; feed rate: 1.5 m/min). Then, drying was performed at 120° C. for 3 minutes using a hot air dryer, and further, aging was performed at 70° C. for 2 days using the same dryer, thereby obtaining synthetic leather 1.

The synthetic leather 1 had a skin layer in which the dye component was evenly dispersed in the polyurethane resin, no uneven dyeing was confirmed, and the synthetic leather 1 exhibited a unique hue with a natural feeling of matcha color.

The content of the dye contained in the skin layer of the synthetic leather 1 is 1% by weight, and the content of the polyurethane resin is 99% by weight (calculated from the charged amount) with respect to the total weight of the skin layer.

Example 2

Synthetic leather was produced according to the flow chart shown in FIG. 3.

(1) Preparation of Compounding Solution for Skin Layer

One hundred (100) parts by weight of solvent-based polycarbonate polyurethane ("RESAMINE P-880" manufactured by Dainichiseika Color & Chemicals Mfg. Co., Ltd.), 0.1 parts by weight of a disperse dye powder ("Dianix Red AC-E" manufactured by Mitsubishi Chemical Corporation), and 0.1 parts by weight of the disperse dye extract-containing DMF obtained in Production Example 2 were stirred with a mixer at a rotation speed of 2000 rpm for 3 minutes, thereby obtaining a compounding solution for the skin layer.

(2) Preparation of Compounding Solution for Adhesive Layer

One hundred (100) parts by weight of polyester/carbonate polyurethane ("UD-8373BL" manufactured by Dainichiseika Color & Chemicals Mfg. Co., Ltd.), 20 parts by weight of DMF, 30 parts by weight of methyl ethyl ketone (MEK), and 8 parts by weight of a crosslinking agent ("RESAMINE NE-crosslinking agent" manufactured by Dainichiseika Color & Chemicals Mfg. Co., Ltd.) were stirred with a mixer at 2000 rpm for 3 minutes, thereby obtaining a compounding solution for the adhesive layer.

(3) Production of Synthetic Leather

The compounding solution for the skin layer obtained above was applied to mold release paper ("ARX-1 Semi Matte Type" manufactured by Asahi Roll Co., Ltd.) with a bar coater (coating thickness: 25 μm), and dried at 120° C. for 5 minutes using a hot air dryer, thereby obtain a skin layer (thickness: 5 μm). Further, the compounding solution for the adhesive layer obtained above was applied to the skin layer with a bar coater (coating thickness: 200 μm; thickness after drying: 100 μm), dried at 80° C. for 1 minute using a hot air dryer, and attached to a base material (100% polyester circular knitted cloth with a thickness of 0.8 mm) using a gravure roll (press pressure: 0.35 MPa; feed rate: 1.5 m/min). Then, drying was performed at 120° C. for 3 minutes using a hot air dryer, and further, aging was performed at 70° C. for 2 days using the same dryer, thereby obtaining synthetic leather 2.

The synthetic leather 2 had a skin layer in which the dye component was evenly dispersed in the polyurethane resin, no uneven dyeing was confirmed, and the vivid color was observed.

The content of the dye contained in the skin layer of the synthetic leather 2 is 1% by weight, and the content of the polyurethane resin is 99% by weight (calculated from the charged amount) with respect to the total weight of the skin layer.

Example 3

Synthetic leather was produced according to the flow chart shown in FIG. 3.

(1) Preparation of Compounding Solution for Skin Layer

One hundred (100) parts by weight of water-based polycarbonate polyurethane ("RESAMINE D-9087" manufactured by Dainichiseika Color & Chemicals Mfg. Co., Ltd.), 0.1 parts by weight of a coffee dye powder ("Food Textile" manufactured by TOYOSHIMA & Co., Ltd.), 0.1 parts by weight of the coffee dye extract-containing distilled water obtained in Production Example 3, 0.8 parts by weight of a thickener ("RESAMINE D-87 thickener" manufactured by Dainichiseika Color & Chemicals Mfg. Co., Ltd.), 0.8 parts by weight of a leveling agent ("RESAMINE D-340 leveling agent" manufactured by Dainichiseika Color & Chemicals Mfg. Co., Ltd.), 1 part by weight of a crosslinking agent ("RESAMINE D-52 crosslinking agent" manufactured by Dainichiseika Color & Chemicals Mfg. Co., Ltd.), and 0.2 parts by weight of a defoamer ("RESAMINE D-79 defoamer" manufactured by Dainichiseika Color & Chemicals Mfg. Co., Ltd.) were stirred with a mixer at a rotation speed of 2000 rpm for 3 minutes, thereby obtaining a compounding solution for the skin layer.

(2) Preparation of Compounding Solution for Adhesive Layer

One hundred (100) parts by weight of polyester/carbonate polyurethane ("UD-8373BL" manufactured by Dainichiseika Color & Chemicals Mfg. Co., Ltd.), 20 parts by weight of DMF, 30 parts by weight of methyl ethyl ketone (MEK), and 8 parts by weight of a crosslinking agent ("RESAMINE NE-crosslinking agent" manufactured by Dainichiseika Color & Chemicals Mfg. Co., Ltd.) were stirred with a mixer (2000 rpm) for 3 minutes, thereby obtaining a compounding solution for the adhesive layer.

(3) Production of Synthetic Leather

The compounding solution for the skin layer obtained above was applied to mold release paper ("ARX-1 Semi Matte Type" manufactured by Asahi Roll Co., Ltd.) with a bar coater (coating thickness: 25 μm), and dried at 120° C. for 5 minutes using a hot air dryer, thereby obtaining a skin layer (thickness: 5 μm). Further, the compounding solution for the adhesive layer obtained above was applied to the skin layer with a bar coater (coating thickness: 200 μm; thickness after drying: 100 μm), dried at 80° C. for 1 minute using a hot air dryer, and attached to a base material (100% polyester circular knitted cloth with a thickness of 0.8 mm) using a gravure roll (press pressure: 0.35 MPa; feed rate: 1.5 m/min). Then, drying was performed at 120° C. for 3 minutes using a hot air dryer, and further, aging was performed at 70° C. for 2 days using the same dryer, thereby obtaining synthetic leather 3.

The synthetic leather 3 had a skin layer in which the dye component was evenly dispersed in the polyurethane resin, no uneven dyeing was confirmed, and the synthetic leather 3 exhibited a unique hue with a natural feeling of coffee color.

The content of the dye contained in the skin layer of the synthetic leather 3 is 1% by weight, and the content of the polyurethane resin is 99% by weight (calculated from the charged amount) with respect to the total weight of the skin layer.

Example 4

Synthetic leather was produced according to the flow chart shown in FIG. 3.

(1) Preparation of Compounding Solution for Skin Layer

One hundred (100) parts by weight of water-based polycarbonate polyurethane ("RESAMINE D-9087" manufactured by Dainichiseika Color & Chemicals Mfg. Co., Ltd.), 0.1 parts by weight of a disperse dye powder ("Dianix Red AC-E" manufactured by Mitsubishi Chemical Corporation), 0.1 parts by weight of the disperse dye extract-containing distilled water obtained in Production Example 4, 0.8 parts by weight of a thickener ("RESAMINE D-87 thickener" manufactured by Dainichiseika Color & Chemicals Mfg. Co., Ltd.), 0.8 parts by weight of a leveling agent ("RESAMINE D-340 leveling agent" manufactured by Dainichiseika Color & Chemicals Mfg. Co., Ltd.), 1 part by weight of a crosslinking agent ("RESAMINE D-52 crosslinking agent" manufactured by Dainichiseika Color & Chemicals Mfg. Co., Ltd.), and 0.2 parts by weight of a defoamer ("RESAMINE D-79 defoamer" manufactured by Dainichiseika Color & Chemicals Mfg. Co., Ltd.) were stirred with a mixer at a rotation speed of 2000 rpm for 3 minutes, thereby obtaining a compounding solution for the skin layer.

(2) Preparation of Compounding Solution for Adhesive Layer

One hundred (100) parts by weight of polyester/carbonate polyurethane ("UD-8373BL" manufactured by Dainichiseika Color & Chemicals Mfg. Co., Ltd.), 20 parts by weight of DMF, 30 parts by weight of methyl ethyl ketone (MEK), and 8 parts by weight of a crosslinking agent ("RESAMINE NE-crosslinking agent" manufactured by Dainichiseika Color & Chemicals Mfg. Co., Ltd.) were stirred with a mixer (2000 rpm) for 3 minutes, thereby obtaining a compounding solution for the adhesive layer.

(3) Production of Synthetic Leather

The compounding solution for the skin layer obtained above was applied to mold release paper ("ARX-1 Semi Matte Type" manufactured by Asahi Roll Co., Ltd.) with a bar coater (coating thickness: 25 μm), and dried at 120° C. for 5 minutes using a hot air dryer, thereby obtaining a skin layer (thickness: 5 μm). Further, the compounding solution for the adhesive layer obtained above was applied to the skin layer with a bar coater (coating thickness: 200 μm; thickness after drying: 100 μm), dried at 80° C. for 1 minute using a hot air dryer, and attached to a base material (100% polyester circular knitted cloth with a thickness of 0.8 mm) using a gravure roll (press pressure: 0.35 MPa; feed rate: 1.5 m/min). Then, drying was performed at 120° C. for 3 minutes using a hot air dryer, and further, aging was performed at 70° C. for 2 days using the same dryer, thereby obtaining synthetic leather 4.

The synthetic leather 4 had a skin layer in which the dye component was evenly dispersed in the polyurethane resin, no uneven dyeing was confirmed, and the vivid color was observed.

The content of the dye contained in the skin layer of the synthetic leather 4 is 1% by weight, and the content of the polyurethane resin is 99% by weight (calculated from the charged amount) with respect to the total weight of the skin layer.

Table 1 shows the evaluation results of the obtained synthetic leathers.

TABLE 1

| Skin layer | | Friction fastness [grade] | |
|---|---|---|---|
| | Dye species | Dry | Wet |
| Example 1 | Matcha dye (powder + extract) | 4-5 | 4-5 |
| Example 2 | Disperse dye (powder + extract) | 4-5 | 4-5 |
| Example 3 | Coffee dye (powder + extracted aqueous solution) | 4-5 | 4-5 |
| Example 4 | Disperse dye (powder + extracted aqueous solution) | 4-5 | 4-5 |

As shown in Table 1, it was confirmed that the synthetic leathers of Examples 1 to 4 obtained by the production method of the present invention have high friction fastness (4th to 5th grade), and are resistant to discoloration and color transfer to the outside.

According to the present invention, it has been confirmed that synthetic leather dyed with a dye can be obtained by a convenient method.

The scope of the present invention is not limited to the above description, and also in examples other than the above examples, the scope of the present invention may be appropriately modified and implemented as long as the gist of the present invention is not impaired. All documents and publications described herein are incorporated herein by reference in their entirety, regardless of their purpose. In addition, this description includes the scope of claims of Japanese Patent Application No. 2020-019859 (filed on Feb. 7, 2020), which is the Japanese patent application on which the priority claim of the present application is based, and the disclosure contents of this description.

INDUSTRIAL APPLICABILITY

The method of the present invention is to produce synthetic leather colored with a dye. The obtained synthetic leather can be used for shoes, bags, clothing, automobile interior materials (for example, automobile seats, ceiling materials, dashboards, door lining materials, and handles), interiors, furniture (for example, sofas and chairs), and the like for a wide range of purposes.

REFERENCE SIGNS LIST

10, 20 Synthetic leather
11, 21 Base cloth
12, 22 Skin layer
13, 23 Adhesive layer
14, 24 Surface treatment layer
25 Porous layer

The invention claimed is:

1. A method for manufacturing synthetic leather having a skin layer on a base cloth, comprising steps of:
   (i) coating a mold-releasable substrate with a skin layer composition containing a natural dye and a polyurethane resin and drying the composition to form a skin layer; and
   (ii) laminating the skin layer on a base cloth;
   wherein the dye is in the form of a dye powder or in both the forms of a dye extract and a dye powder so as to be mixed with the polyurethane resin in step (1).

2. The method according to claim 1, wherein the dye is in at least one form of a dye extract and a dye powder so as to be mixed with the polyurethane resin in the step (i).

3. The method according to claim 1, wherein the dye is evenly dispersed in the polyurethane resin in the skin layer.

4. The method according to claim 1, wherein the natural dye is selected from plant-derived natural dyes, animal-derived natural dyes, and mineral-derived natural dyes, and chemical dyes are selected from the group consisting of disperse dyes, reactive dyes, acid dyes, and vat dyes.

5. The method according to claim 1, wherein the dye includes natural plant-derived dyes.

6. The method according to claim 1, wherein the polyurethane resin is a water-based polyurethane resin or a solvent-based polyurethane resin.

7. The method according to claim 1, wherein the base cloth is a knitted fabric, woven fabric, or non-woven fabric of fibers.

8. The method according to claim 1, which comprises a step of forming a porous layer on the base cloth before the step (ii), and wherein the skin layer is laminated on the porous layer in the step (ii).

9. The method according to claim 1, which comprises a step of embossing after the step (ii).

10. The method according to claim 1, which comprises a step of forming a surface treatment layer on the skin layer after the step (ii).

11. The method according to claim 1, which comprises a step of peeling the mold-releasable substrate from the skin layer before or after the step (ii).

12. The method according to claim 1, wherein the dye is in the form of a dye powder or in both the forms of a dye extract and a dye powder so as to be mixed with the polyurethane resin in the step (i).

13. The method according to claim 1, wherein the dye is in the form of a dye powder, wherein the average particle size of the dye powder is 1 to 50 μm.

* * * * *